(12) United States Patent
Przygoda et al.

(10) Patent No.: US 6,840,479 B1
(45) Date of Patent: Jan. 11, 2005

(54) AIRFRAME MOUNTED ACCESSORY DRIVE (AMAD) POWER TAKE-OFF SHAFT AUXILIARY POWER GENERATION

(75) Inventors: Edward A. Przygoda, Florissant, MO (US); Thomas W. Omohundro, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/728,634

(22) Filed: Dec. 5, 2003

(51) Int. Cl.[7] .............................................. B64D 41/00
(52) U.S. Cl. .............................. 244/58; 244/60; 60/290
(58) Field of Search .............................. 244/53 R, 58, 244/60; 60/290, 802, 796, 797

(56) References Cited

U.S. PATENT DOCUMENTS 4,912,921 A * 4/1990 Rice et al. ..................... 60/774
6,142,418 A * 11/2000 Weber et al. .................. 244/58

* cited by examiner

*Primary Examiner*—Peter M. Poon
*Assistant Examiner*—Timothy D. Collins
(74) *Attorney, Agent, or Firm*—Shimokaji & Associates, P.C.

(57) ABSTRACT

In an aircraft having an engine and an AMAD, a power take off shaft is rotationally connected to the engine, and the power take off shaft provides rotational power from the engine. A power producing device having an internal shaft is provided for producing additional auxiliary power. The power producing device may be an electrical generator with an internal shaft rotationally connected to the power take off shaft. The electrical generator converts one portion of the rotational power to additional electrical power, and fits in a pre-existing unused space within the aircraft, located between the engine and the AMAD. An output shaft is rotationally connected to the power take off shaft and rotationally connects to the AMAD to provide another portion of the rotational power to the AMAD. Additional electrical power generation is produced without modification to the engine, AMAD, or existing electrical generators.

34 Claims, 8 Drawing Sheets

FIG. 7

AIRFRAME MOUNTED ACCESSORY DRIVE (AMAD) POWER TAKE-OFF SHAFT AUXILIARY POWER GENERATION

BACKGROUND OF THE INVENTION

The present invention generally relates to aircraft power systems and, more particularly, to auxiliary power generation for military aircraft.

Most mature military aircraft—such as the F-15—lack sufficient electrical power to run more modern power hungry systems, such as current electronic systems, for example, for avionics and weapons systems. One attractively simple, in concept, solution for increasing the available power is to modify the Airframe Mounted Accessory Drive (AMAD) to provide more power and install a larger generator on the AMAD. Usually this solution is difficult or impossible to achieve for at least two reasons: (1) no empty volume exists within the aircraft for a larger generator and AMAD to grow into, and (2) changing the AMAD and generator is cost prohibitive. Other options, however, are typically less attractive or not feasible for various reasons. For instance, a pop-up air scoop could be deployed to drive a Ram Air Turbine (RAT) that would drive a generator. This solution, for example, imposes additional aerodynamic drag on the aircraft, which could adversely affect aircraft performance— unacceptable for military fighter aircraft such as the F-15, and incurs a large amount of weight and mechanical complexity compared to the amount of extra power generated so that it is inefficient from both a cost and energy standpoint.

Figure 1A:
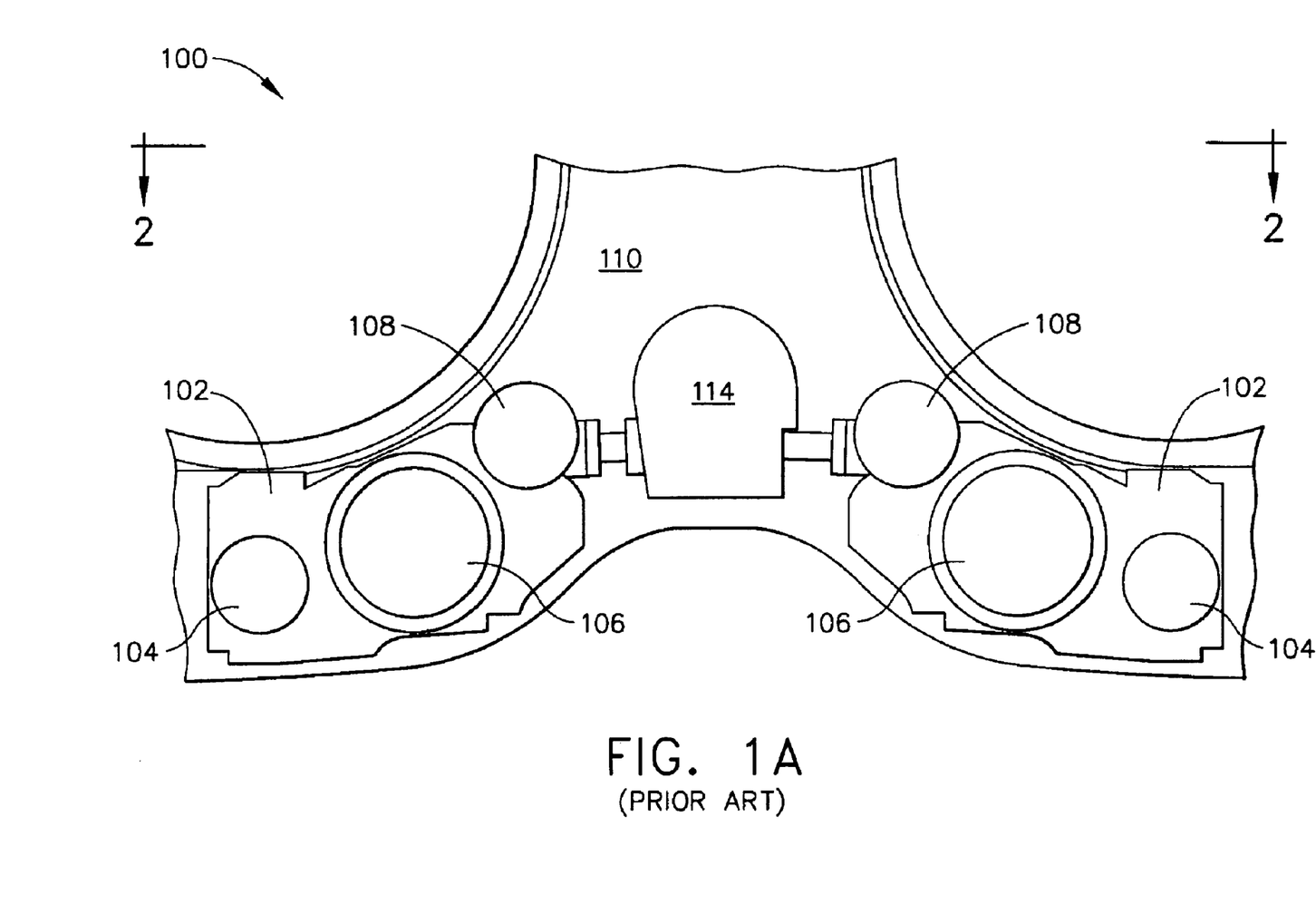
FIG. 1A is an elevation view diagram showing a prior art AMAD and power system accessory configuration for a typical mature military aircraft.
Figure 1B:
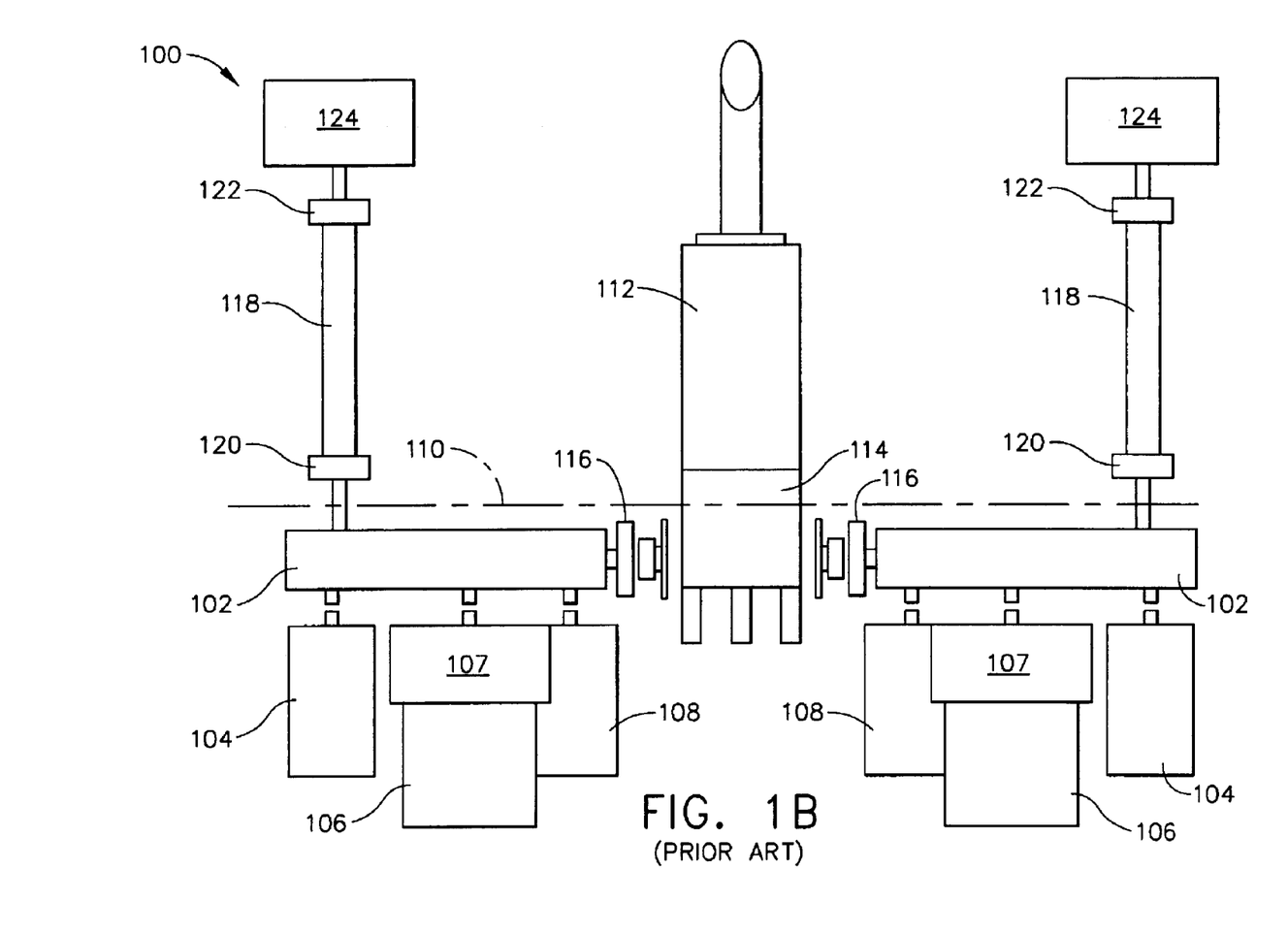
FIG. 1B is a bottom view diagram showing the prior art AMAD and power system accessory configuration for a typical mature military aircraft shown in FIG. 1A.
Figure 2:
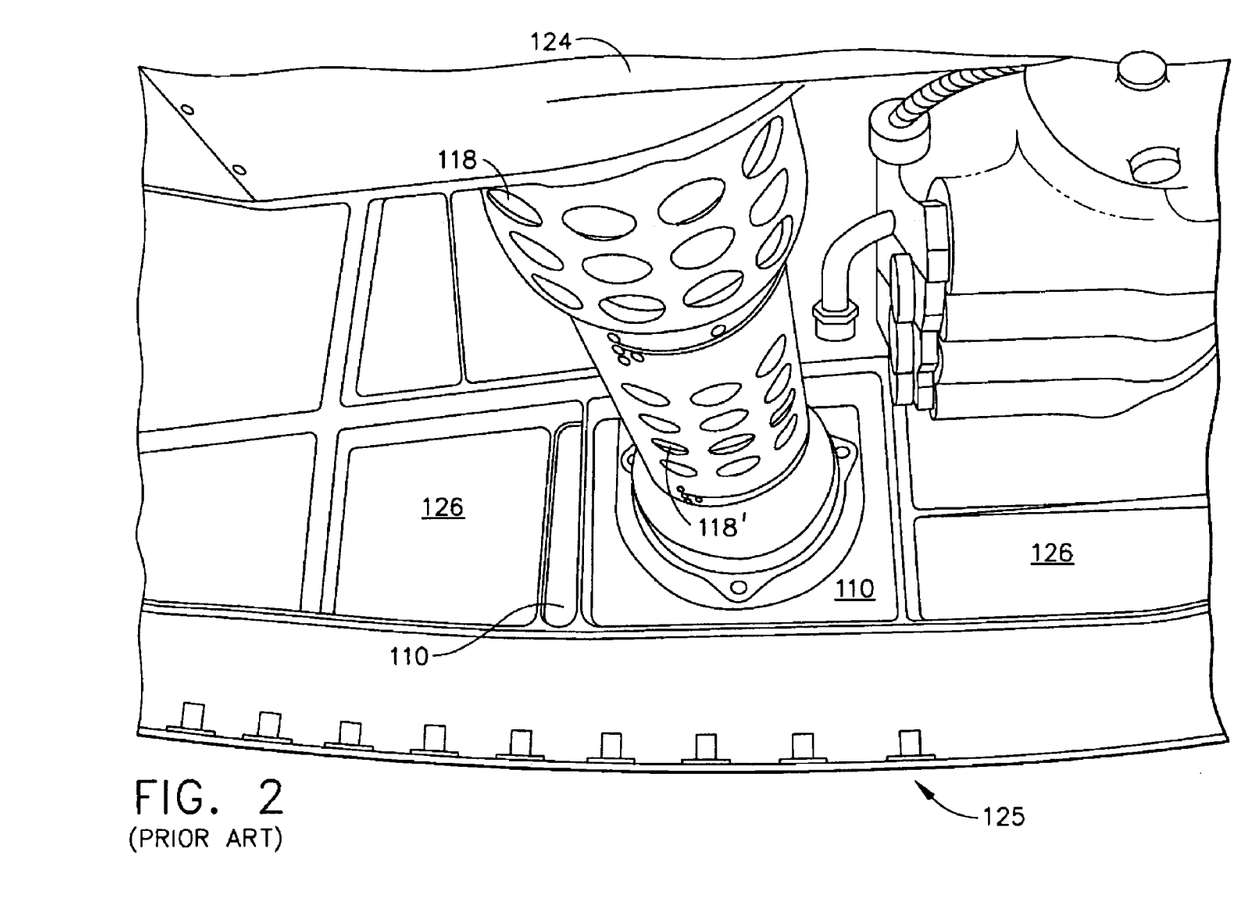
FIG. 2 is a perspective view showing a prior art engine mounted gearbox, drive shaft, and bulkhead to which an AMAD is mounted for a typical mature military aircraft.
Figure 3:
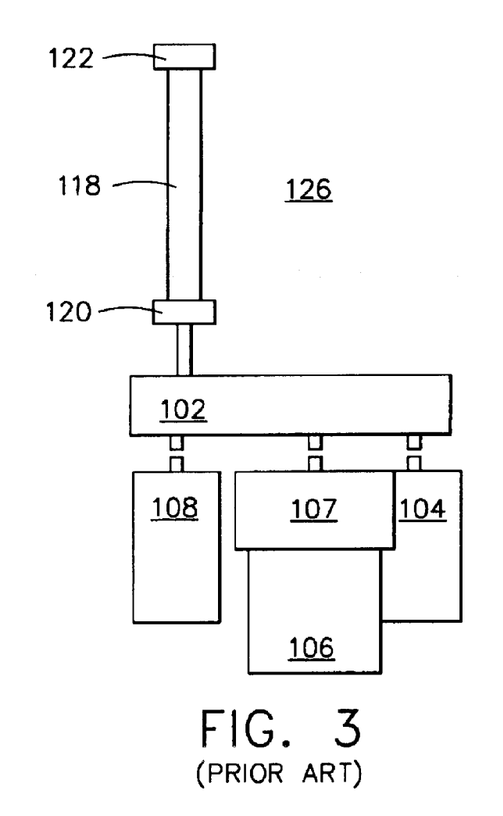
FIG. 3 is a plan view diagram showing a prior art AMAD and power system accessory configuration similar to that shown in FIGS. 1A and 1B, for a typical mature military aircraft.

FIGS. 1A, 1B, and FIG. 3 illustrate a typical AMAD and accessory configuration 100 for an existing military aircraft—such as the twin engine F-15. The following discussion, however, may also be applicable to other multiple engine aircraft and to single engine aircraft. An example of a mature, single engine, military aircraft is the F-16. Configuration 100 may include at least one AMAD 102, to which may be mounted various power accessories, such as a power conversion hydraulic pump 104, an electric generator 106, and a utility hydraulic pump 108. AMADs 102 may be mounted to a bulkhead 110, the general location of which is indicated by a dashed line in the diagram of FIG. 1B. A jet fuel starter 112 may be provided for supplying power to start the main jet engines (not shown) of the aircraft. When starting the main engines of the aircraft, jet fuel starter 112 may provide power through a central gearbox 114 via drives 116 to AMADs 102. AMADs 102, in turn, provide power for starting to the main jet engines through power take off (PTO) shafts 118. PTO shafts 118 may be connected to AMADs 102 at an AMAD end 120 and, at an engine end 122, to a main jet engine or an engine mounted gearbox 124, also shown in FIG. 2. After the main engines have been started, central gearbox 114 may operate to disconnect jet fuel starter 112 from power communication with AMADs 102 so that each AMAD 102 may be driven by a main engine, for example, through an engine mounted gearbox 124 via a PTO shaft 118, and, in turn, AMAD 102 may drive the power accessories, such as power conversion hydraulic pump 104, electric generator 106, and utility hydraulic pump 108. Electric generator 106 may be driven through a gearbox 107 connected between AMAD 102 and electric generator 106.

FIG. 2 shows a view for a typical, mature military aircraft 125 of empty volume or unused space 126 around the drive shaft connecting the engine to the AMAD. Unused space 126 is located between the engine and the AMAD on the opposite side of bulkhead 110 from that on which AMAD 102 is mounted, so that FIG. 2 shows engine mounted gearbox 124, and PTO shaft cover 118', underneath which PTO shaft 118 is located, extending between engine mounted gearbox 124 and bulkhead 110. Thus, unused space 126 is generally considered to be unusable for the purpose of providing larger power accessories for AMAD 102. Furthermore, as described above, typical mature aircraft don't have excess space around their existing generators— such as generator 106—on the opposite side of bulkhead 110 from that shown in FIG. 2 in which to replace the existing generator with a larger one.

As can be seen, there is a need for significantly increasing the electrical power generation capacity of existing mature military aircraft while avoiding costly and perhaps impossible modifications to the existing AMAD and generator configuration of such aircraft. There is also a need for significantly increasing the electrical power generation capacity of existing mature military aircraft that uses available unused space and does not require changing the existing AMAD and generator. Furthermore, there is a need for providing for mature aircraft an attractive, cost effective electrical power solution where none existed and, therefore, enabling incorporation of present day and future electronic systems on mature aircraft, which may extend the life of aircraft like the F-15.

SUMMARY OF THE INVENTION

In one aspect of the present invention, a power generation system is disclosed for an aircraft having an engine and an AMAD. The system includes a power take off shaft that transmits rotational mechanical power from the engine, a power producing device that converts one portion of the rotational mechanical power to another form of power; and an output shaft that transmits another portion of the rotational mechanical power to the AMAD.

In another aspect of the present invention, an electrical power generation system is disclosed for an aircraft having an engine and an AMAD. The system includes a power take off shaft connected to the engine and that provides rotational power from the engine; an electrical generator that converts one portion of the rotational power to electrical power; and an output shaft connected to the AMAD that provides another portion of the rotational power to the AMAD.

In still another aspect of the present invention, a generator assembly is disclosed for an aircraft having an engine and an AMAD. The generator assembly includes a power take off shaft having a spline interface at an engine end of the power take off shaft; an electrical generator having an internal shaft that is rotationally connected to the power take off shaft; and an output shaft rotationally connected to the power take off shaft and having a spline interface at an AMAD end of the output shaft.

In yet another aspect of the present invention, an aircraft having an engine and an AMAD is disclosed. The aircraft includes a power take off shaft having a mechanical connection to the engine at an engine end of the power take off shaft. The power take off shaft is rotationally connected to the engine, and the power take off shaft provides rotational power from the engine. The aircraft also includes an electrical generator having an internal shaft. The internal shaft is rotationally connected to the power take off shaft. The electrical generator converts one portion of the rotational power to electrical power, and the generator fits in a space within the aircraft, the space being located between the engine and the AMAD. An output shaft is rotationally connected to the power take off shaft and has a mechanical connection to the AMAD at an AMAD end of the output shaft. The output shaft provides another portion of the rotational power to the AMAD.

In a further aspect of the present invention, a method is disclosed for providing auxiliary electrical power in an aircraft having an engine and an AMAD. The method includes steps of: rotationally connecting a power take off shaft to the engine; rotationally connecting an electrical generator to the power take off shaft; rotationally connecting the power take off shaft to the AMAD; and using the power take off shaft to drive the electrical generator, providing electrical power.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides for significantly increased electrical power generation capacity for aircraft and, particularly for existing mature military aircraft, for example, providing significantly increased electrical power generation capacity without changing the existing AMAD and generator. Many mature military aircraft, for example, lack sufficient electrical power generating capacity to power many of the more modern electronic systems—such as avionics and weapons systems—that are desired to upgrade the aircraft.

While mature aircraft typically don't have excess space around their existing generators and AMADs, they usually do have space around the drive shaft, or power take off shaft, connecting the engine to the AMAD. An embodiment of the present invention may use this space between the engine and AMAD, around the drive shaft connecting the engine to the AMAD, to incorporate an additional power producing device into the drive shaft. For example, a hydraulic pump could be incorporated for providing additional hydraulic power for the aircraft or an electrical generator could be incorporated for providing additional electrical power for the aircraft. Engine drive shafts are generally designed with enough excess margin that an additional power producing device—such as a generator—can be incorporated without redesigning the engine power takeoff. Although the example of an electrical generator is used to illustrate embodiments of the present invention, it will be apparent that any other compact energy or power producing device—such as a hydraulic pump—may be substituted in the examples presented, either to provide energy in other forms—such as hydraulic power—or to provide energy which can be converted into electrical energy.

In one embodiment, the power producing device—such as a generator or pump—could be mounted to the AMAD or, in another embodiment, to the engine. Thus, an embodiment uses available unused space and does not require changing the existing AMAD, generators, or pumps. In one embodiment, for example, a pair of generators may produce enough power to provide 50 kilowatts (kW) or more of additional electrical power from F-15 engines, significantly increasing the electrical power generation capacity of an existing mature military aircraft while avoiding costly and perhaps impossible modifications to the existing AMAD and generator configuration of such aircraft. In contrast to the prior art, one embodiment provides an attractive, cost effective solution to the problem of providing additional electrical power for upgraded systems where no solution was known to exist. One embodiment therefore enables incorporation of present day electronic systems, and may enable incorporation of future electronic systems, on mature aircraft, and may thus extend the life of mature military aircraft like the multiple-engine F-15. An embodiment may also be applicable to single engine aircraft as well as to multiple engine aircraft.

Figure 4:
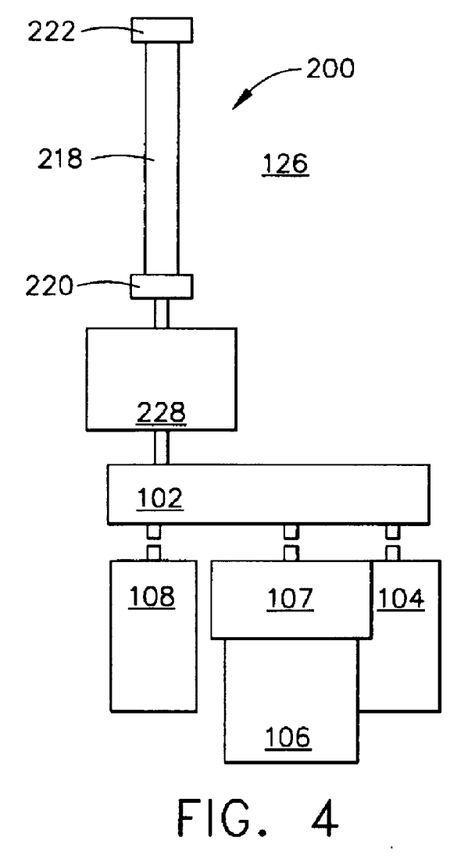
FIG. 4 is a plan view diagram showing an AMAD and power system accessory configuration, according to one embodiment of the present invention, for a typical mature military aircraft.

Referring now to the figures, FIG. 4 illustrates, by comparison to the prior art shown in FIG. 3, one exemplary embodiment of an electrical power generation system 200 showing the location of an added electrical generator 228 in a pre-existing formerly unused space 126, or volume, between the engine of aircraft 125 and AMAD 102. Space 126 may be located, for example in the vicinity of pre-existing power take off shaft 118 formerly connecting the engine to AMAD 102 and may be located on the opposite side of a bulkhead—such as bulkhead 110 from the side on which AMAD 102 may be located or mounted. Electrical generator 228 may be connected to a shortened power take off (PTO) shaft 218 having an output end 220 and an engine end 222. Electrical generator 228 may be, for example, a permanent magnet generator (PMG) and may be connected to a power control unit (PCU) for regulating and controlling the power output of electrical generator 228. A subsystem including one PMG and one PCU may be installed for each PTO shaft of a multiple engine aircraft—such as an F-15, used as an example to illustrate one embodiment—so that, for example, an electrical power generation system for an F-15 may include two subsystems—such as system 200—each providing a portion of the total power output produced by the electrical power generation system. The power provided may be specified, depending on the aircraft and application, as being output over a pre-determined range of engine speeds—such as 72% to 100% of engine speed, for example, for an aircraft like the F-15. For the F-15 example, electrical power generation system 200 may make available a full output power capability of, for example, more than 25 kW electrical power over the full speed range of 72% to 100% speed. Using two such systems 200, an aircraft like the F-15 may be capable of providing 25 kW or more from each subsystem for a total additional power output that may be in excess of 50 kW, for example, depending on engine and PTO shaft ratings.

For example, electrical generator 228 may have sufficient capacity to provide enough power to the PCU so that the PCU may provide at least 25 kW of regulated power to the aircraft electrical systems, which may typically be, for example, a 270 Volt direct current (VDC) system. When the efficiencies of the generator 228 and PCU are taken into account, PTO shaft 218 may provide approximately 30 to 45 horsepower in excess of that provided by PTO shaft 118 in order to be able to provide the additional electrical power of approximately 25 kW. A PTO shaft—such as PTO shaft 118—may typically provide in the range of about 200 to 300 horsepower in the form of rotational mechanical energy. Thus, it may be practical for PTO shaft 218 to provide rotational mechanical power from the engine so that one portion of the rotational power may be used by the generator for conversion to electrical power and another, remaining portion may be transmitted to the AMAD on account of the increased load on the power take off shaft being within the working margin, for example, of the shaft connections to the engine, as described above.

Figure 5A:
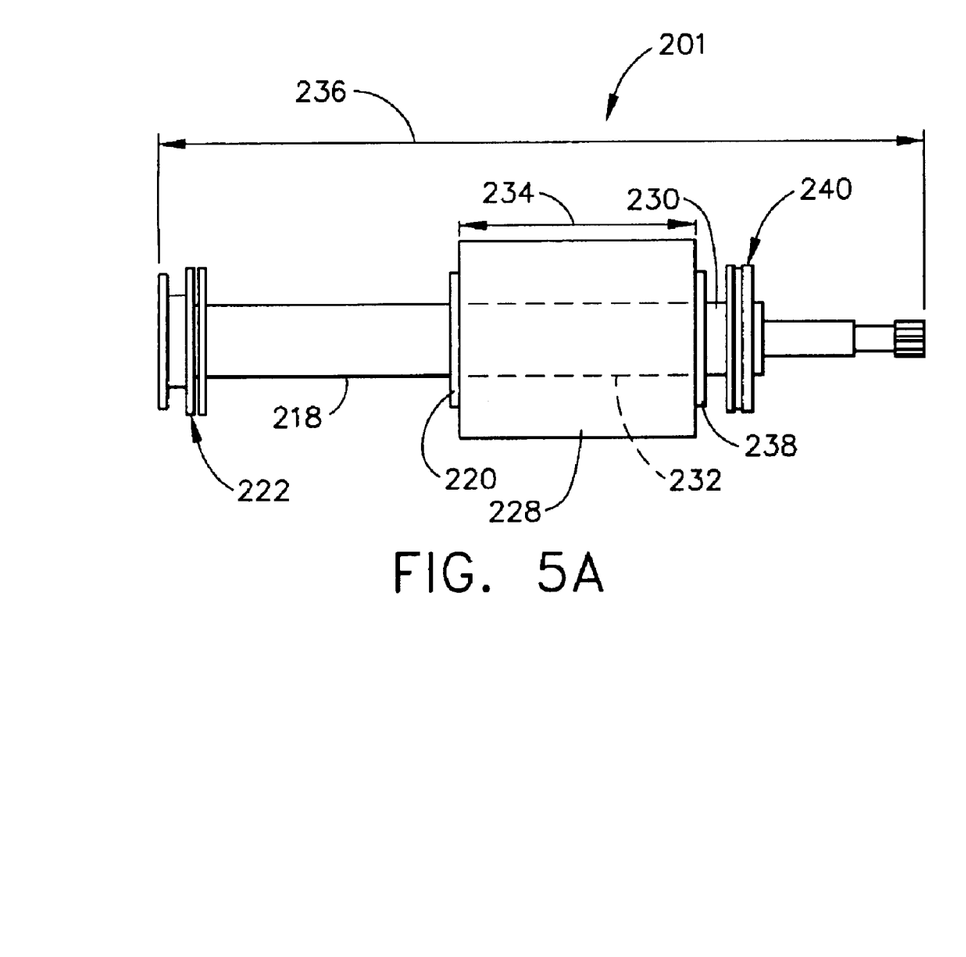
FIGS. 5A, 5B, and 5C show, respectively, side, end, and exploded view diagrams of a modified drive shaft and electric power generator according to one embodiment of the present invention.
Figure 5B:
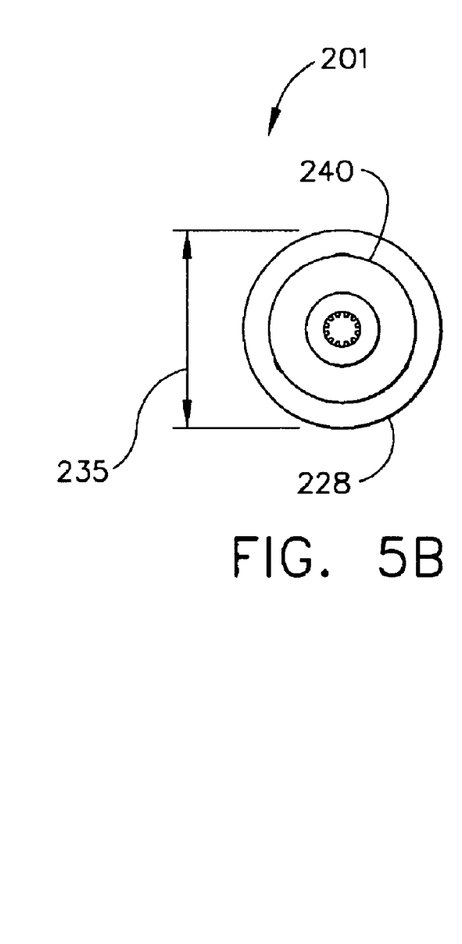
Figure 5C:
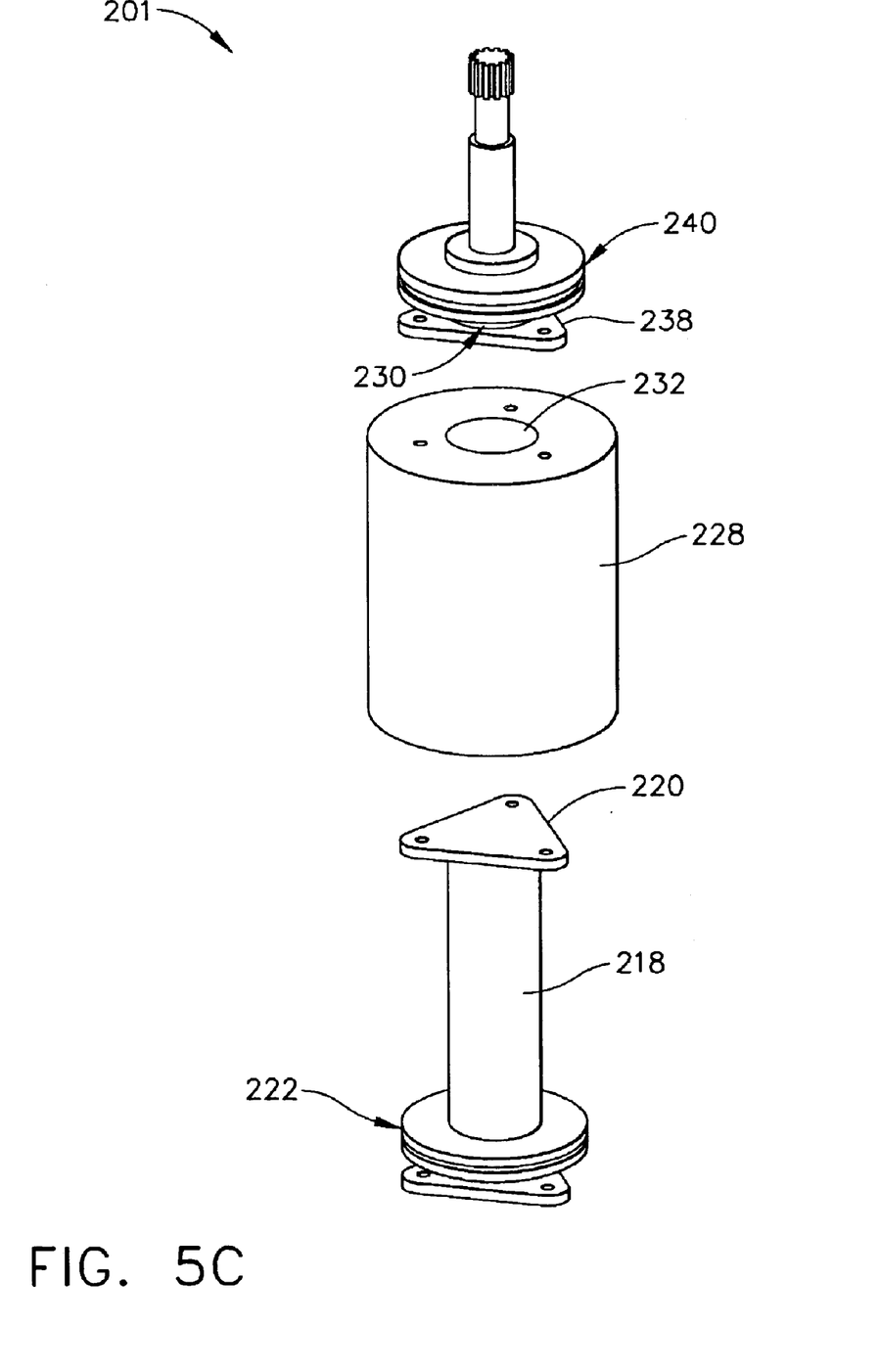

FIGS. 5A, 5B, and 5C show in greater detail an electrical generator assembly 201 according to one embodiment. As shown in FIG. 5A, electrical generator 228 may be driven by PTO shaft 218 and may be installed in series with PTO shaft 218. In other words, electrical generator 228 may be installed so that PTO shaft 218 drives electrical generator 228, and electrical generator 228 drives an output shaft 230. Electrical generator 228 may be activated by an internal shaft 232 driven by PTO shaft 218. For example, electrical generator 228 may be a PMG and may have a rotor (not shown) mounted to internal shaft 232, which may require bearings at each end of the internal PMG shaft 232. Internal shaft 232 may drive output shaft 230. Thus, internal shaft 232 may provide one portion of the rotational power transmitted from the engine by PTO shaft 218 to electrical generator 228 for conversion to electrical power and may provide another portion to output shaft 230.

For example, in one embodiment a PMG generator having a length 234 of about 7.0 inches (in.) and a diameter 235 of about 6.0 in. may be capable of providing the additional electrical power required. For a generator with a length 234 of 7.0 inches (in.) the combined length of PTO shaft 218 and output shaft 230 may be shortened by approximately 7.0 in. relative to the length of PTO shaft 118. Thus, the combined length 236 of PTO shaft 218, internal shaft 232, and output shaft 230 may be approximately the same as that of PTO shaft 118 formerly connecting the engine to AMAD 102.

PTO shaft 218 may have an engine end 222 that may include a spline interface to the engine that may be identical to the pre-existing PTO shaft 118 and spline and may connect to the engine in the same manner as the pre-existing PTO shaft 118. PTO shaft 218 may have an output end 220 including a mechanical connection, as shown in FIG. 5A and more clearly seen in the exploded view of FIG. 5C, to internal shaft 232 that may transmit rotation of PTO shaft 218 to internal shaft 232 (and vice versa) so that PTO shaft 218 may also be said to be rotationally connected to internal shaft 232. As shown in FIGS. 5A and 5C, internal shaft 232 may be mechanically connected to PTO shaft 218 at one end and may be mechanically connected to output shaft 230 at the other end.

Output shaft 230 may have an input end 238 including a mechanical connection, as shown in FIG. 5A and more clearly seen in the exploded view of FIG. 5C, to internal shaft 232 that may transmit rotation of internal shaft 232 to output shaft 230 (and vice versa) so that output shaft 230 may also be rotationally connected to internal shaft 232. Output shaft 230 may have an AMAD end 240 that may include a spline interface to the AMAD that may be identical to the pre-existing PTO shaft 118 and spline and may connect to the AMAD in the same manner as the pre-existing PTO shaft 118.

Figure 6:
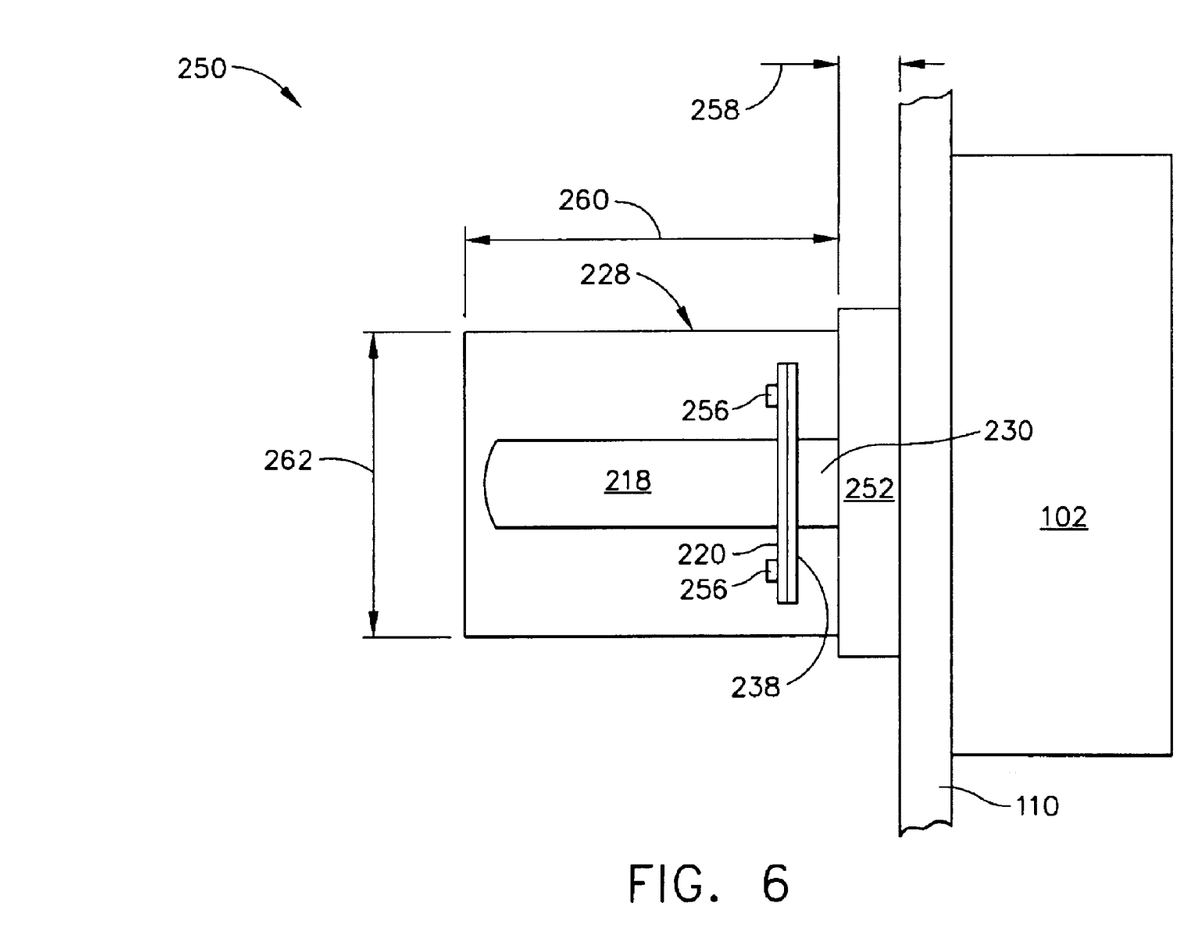
FIG. 6 shows a side view diagram of a modified drive shaft, electric power generator, gearbox, bulkhead, and AMAD according to another embodiment of the present invention.
Figure 7:
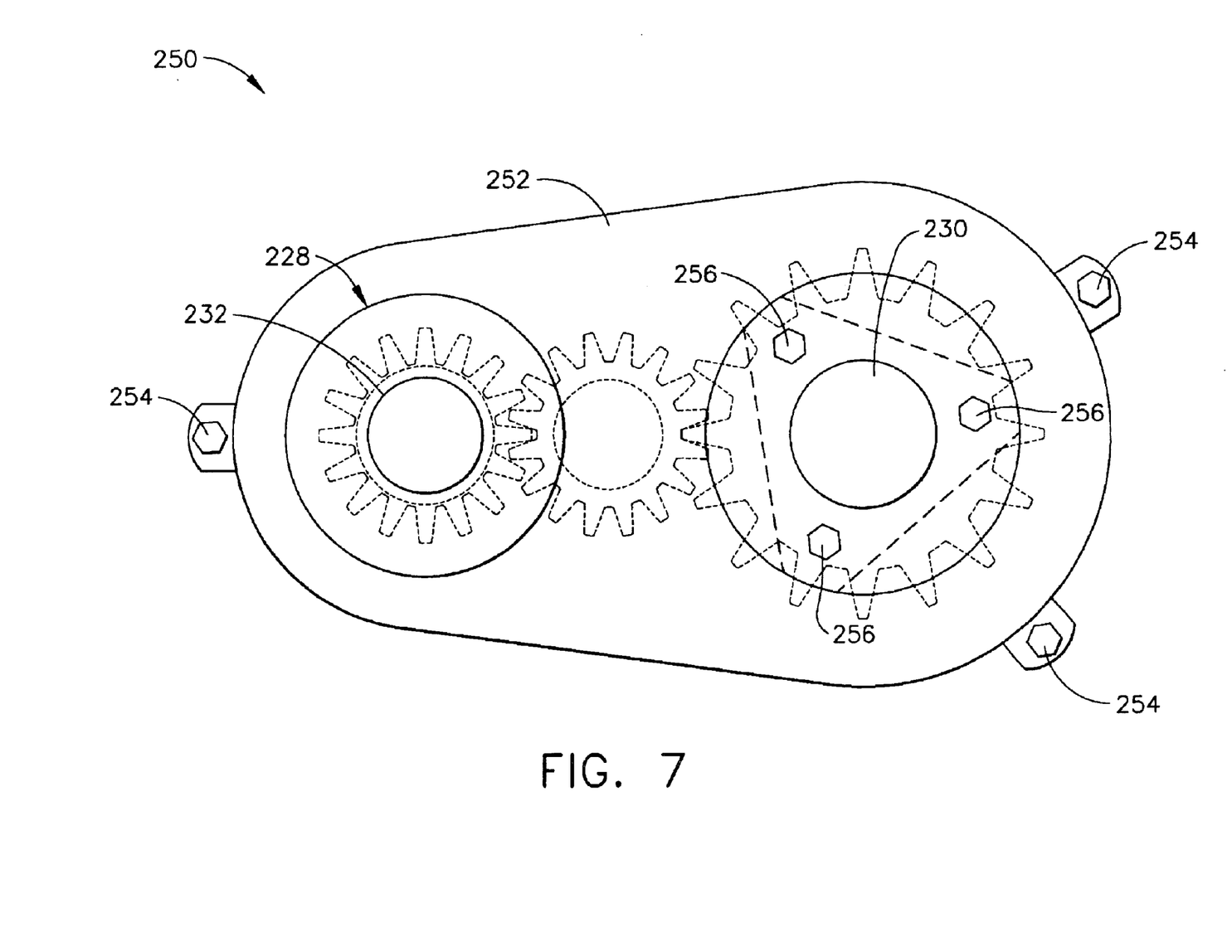
FIG. 7 shows an end view diagram of an electric power generator and gearbox, according to the embodiment shown in FIG. 6.

Referring now to FIGS. 6 and 7, an alternative exemplary embodiment of an electrical generator assembly 250 is illustrated. Electrical generator assembly 250 may include a gearbox 252 for rotationally connecting power take off shaft 218 to generator 228 so that, as described above, one portion of the rotational mechanical power from the engine may be used by the generator 228 for conversion to electrical power and another, remaining portion may be transmitted to the AMAD. Gearbox 252 may be mounted on bulkhead 110 on the opposite side of bulkhead 110 on which AMAD 102 may be mounted, as shown in FIG. 6. Gearbox 252 may be mounted, for example, using bolts 254 as shown in FIG. 7. Gearbox 252 may have a thickness 258 of approximately 1.5 in., for example. Generator 228 of electrical generator assembly 250 may, for example, have a length 260 of approximately 6.0 in. and a diameter 262 of approximately 4.0 in.

Gearbox 252 may be configured so that power take off shaft 218 may drive generator 228 and may also simultaneously drive AMAD 102 through output shaft 230. For example, power take off shaft 218 may drive output shaft 230, and output shaft 230 may drive internal shaft 232 of generator 228 through gearbox 252 as shown in FIG. 7. Gearbox 252 may provide, for example, a 3:1 gear ratio between output shaft 230 and internal shaft 232. PTO shaft 218 may be rotationally connected at an output end 220 to output shaft 230 at an input end 238 via a mechanical connection, for example, including bolts 256, shown in FIGS. 6 and 7. Output shaft 230 may include a spline interface to the AMAD 102 that may rotationally connect to the AMAD in the same manner as the pre-existing PTO shaft 118 so that output shaft 230 may also be used to drive AMAD 102 as well as generator 228. With PTO shaft 218 connected directly to output shaft 230, a total length of the power take off shaft 218 and the output shaft 230 may be the same as a length of a pre-existing power take off shaft—such as PTO shaft 118—formerly connecting the engine to the AMAD. Thus, electrical generator assembly 250 may connect the engine to the AMAD similarly to and fit in the same space as a preexisting PTO shaft 118 connecting the engine to the AMAD, without modifications to either the engine or the AMAD.

A method of providing auxiliary electrical power in an aircraft may include rotationally connecting a power take off shaft to the engine and to the AMAD of the aircraft, and to an electrical generator, and using the power take off shaft to drive the electrical generator to provide additional electrical power for the aircraft. For example, an electrical generator assembly—such as electrical generator assembly 201 or electrical generator assembly 250—may be connected in place of the existing power take off shaft—such as power take off shaft 118. The electrical generator assembly—such as electrical generator assembly 201 or 250—may include a power take off shaft 218 which may be rotationally connected to the engine by connecting power take off shaft 218 to a pre-existing spline interface with the engine. The method may include rotationally connecting the power take off shaft 218 to an output shaft—such as output shaft 230—and connecting the output shaft to a pre-existing spline interface with the AMAD.

The method may include rotationally connecting the electrical generator to the power take off shaft by mechanically connecting an internal shaft of the electrical generator—such as internal shaft 232—to the power take off shaft and mechanically connecting the output shaft to the internal shaft so that the power take off shaft, the internal shaft, and the output shaft are connected in series between the engine and the AMAD, as exemplified by electrical generator assembly 201.

The method may also include rotationally connecting the electrical generator to the power take off shaft by rotationally connecting the internal shaft of the electrical generator to the power take off shaft via a gearbox—such as gearbox 252—and mechanically connecting the output shaft to the power take off shaft so that the power take off shaft and the output shaft are connected in series between the engine and the AMAD, as exemplified by electrical generator assembly 250.

It should be understood, of course, that the foregoing relates to preferred embodiments of the invention and that modifications may be made without departing from the spirit and scope of the invention as set forth in the following claims.

We claim:

1. A power generation system for an aircraft having an engine and an AMAD, comprising:
    a power take off shaft that transmits a rotational mechanical power from the engine;
    a power producing device that uses a first portion of said rotational mechanical power from said power take off shaft, wherein the first portion does not pass through the AMAD to the power producing device, to convert said first portion of said rotational mechanical power to another form of power and leaves a second remaining portion of said rotational mechanical power in said power take off shaft to transmit to the AMAD, said first and second portions being mutually exclusive; and
    an output shaft that transmits a second portion of said rotational mechanical power to the AMAD.

2. The system of claim 1, wherein said power producing device occupies a pre-existing unused volume in the vicinity of a pre-existing power take off shaft formerly connecting the engine to the AMAD.

3. The system of claim 1, wherein:
    said power producing device is located on an opposite side of a bulkhead from the AMAD.

4. The system of claim 1, wherein:
    said power producing device is installed in series with said power take off shaft, and
    said power producing device is driven by said power take off shaft.

5. The system of claim 1, wherein:
    said power producing device has an internal shaft;
    said power take off shaft is connected to said internal shaft; and
    said output shaft is connected to said Internal shaft.

6. The system of claim 1, wherein:
    said power producing device has an internal shaft;
    said power take off shaft drives said internal shaft through a gearbox; and
    said output shaft is connected to said power take off shaft.

7. The system of claim 1, wherein said output shaft is connected to the AMAD in the same manner as a pre-existing power take off shaft formerly connecting the engine to the AMAD.

8. The system of claim 1, wherein said power take off shaft is connected to the engine in the same manner as a pre-existing power take off shaft formerly connecting the engine to the AMAD.

9. The system of claim 1, wherein said system provides at least 25 kW of electrical power over a pre-determined range of engine speeds.

10. The system of claim 1, further comprising:
    a second generator driven by a second power take off shaft wherein said system provides at least 50 kW of electrical power over a pre-determined range of engine speeds.

11. An electrical power generation system for an aircraft having an engine and an AMAD, comprising:
    a power take off shaft connected to the engine and that provides rotational power from the engine, wherein said rotational power from said power take off shaft has a first portion not provided to the AMAD and a second remaining portion provided to the AMAD;
    an electrical generator that uses said first portion of said rotational power to convert to electrical power; and
    an output shaft connected to the AMAD that provides said second portion of said rotational power to the AMAD.

12. The system of claim 11 wherein:
    said generator has an internal shaft connected to said power take off shaft and connected to said output shaft, and
    said internal shaft is connected in series between said power take off shaft and said output shaft.

13. The system of claim 11 wherein said power take off shaft has a spline and said power take off shaft spline interfaces to the engine in a manner identical to that of a pre-existing power take off shaft formerly connecting the engine to the AMAD.

14. The system of claim 11 wherein said output shaft has a spline and said output shaft spline Interfaces to the AMAD In a manner identical to that of a pre-existing power take off shaft formerly connecting the engine to the AMAD.

15. The system of claim 12 wherein a total length of said power take off shaft, said internal shaft, and said output shaft is the same as a length of a pre-existing power take off shaft formerly connecting the engine to the AMAD.

16. The system of claim 11 wherein
    said generator has an internal shaft connected through a gearbox to said power take off shaft, and
    said output shaft is connected to said power take off shaft.

17. The system of claim 16 wherein a total length of said power take off shaft and said output shaft is the same as a length of a pre-existing power take off shaft formerly connecting the engine to the AMAD.

18. The system of claim 11, further comprising:
    a power control unit electrically connected to said generator wherein said power control unit provides at least 25 kW of electrical power over a range of 72% to 100% of engine speed.

19. A generator assembly for an aircraft having an engine and an AMAD, comprising:

a power take off shaft having a spline interface at an engine end of said power take off shaft;

an electrical generator having an internal shaft wherein said internal shaft has a direct rotational connection to said power take off shaft, wherein said direct rotational connection does not pass through the AMAD; and an output shaft rotationally connected to said power take off shaft and having a spline interface at an AMAD end of said output shaft.

20. The generator assembly of claim 19 wherein:

said output shaft is rotationally connected to said power take off shaft via a first mechanical connection between said power take off shaft and said internal shaft and a second mechanical connection between said internal shaft and said output shaft, and said internal shaft is rotationally connected to said power take off shaft via said first mechanical connection.

21. The generator assembly of claim 19 wherein:

said output shaft is rotationally connected to said power take off shaft via a mechanical connection between said power take off shaft and said output shaft, and said internal shaft is rotationally connected to said power take off shaft via a gearbox.

22. The generator assembly of claim 19 wherein said generator assembly replaces a pre-existing power take off shaft formerly connecting the engine to the AMAD.

23. The generator assembly of claim 19 wherein:

said spline interface at the engine end of said power take off shaft matches that of a pre-existing power take off shaft formerly connecting the engine to the AMAD;

said spline interface at the AMAD end of said output shaft matches that of a pre-existing power take off shaft formerly connecting the engine to the AMAD; and said generator assembly has a length between said spline interface at the engine end of said power take off shaft and said spline interface at the AMAD end of said output shaft equal to a length of a pre-existing power take off shaft formerly connecting the engine to the AMAD.

24. The generator assembly of claim 19 wherein:

said generator assembly fits in a space within the aircraft, a portion of which space was occupied by a pre-existing power take off shaft formerly connecting the engine to the AMAD; and said generator assembly connects the engine to the AMAD.

25. The generator assembly of claim 19 wherein:

said power take off shaft provides a rotational power from the engine, said electrical generator converts a first portion of said rotational power to electrical power; and said output shaft provides a second portion of said rotational power to the AMAD.

26. The generator assembly of claim 19 wherein said electrical generator produces sufficient electrical power to provide at least 25 kW of electrical power over a range of 72% to 100% of engine speed.

27. An aircraft having an engine and an AMAD, said aircraft comprising:

a power take off shaft having a mechanical connection to the engine at an engine end of said power take off shaft, wherein said power take off shaft is rotationally connected to the engine, and said power take off shaft provides a rotational power from the engine;

an electrical generator having an internal shaft wherein:

said internal shaft is rotationally connected to said power take off shaft;

said electrical generator converts a first portion of said rotational power to electrical power; and said generator fits in a space within the aircraft, said space located between the engine and the AMAD; and an output shaft rotationally connected to said power take off shaft and having a mechanical connection to the AMAD at an AMAD end of said output shaft, wherein said output shaft provides a second portion of said rotational power to the AMAD.

28. The aircraft of claim 27 wherein:

said output shaft is rotationally connected to said power take off shaft in series via said internal shaft, and said internal shaft is rotationally connected to said power take off shaft via a mechanical connection.

29. The aircraft of claim 27 wherein:

said output shaft is rotationally connected to said power take off shaft via a mechanical connection between said power take off shaft and said output shaft, and said internal shaft is rotationally connected to said power take off shaft via a gearbox.

30. A method for providing auxiliary electrical power in an aircraft having an engine and an AMAD, comprising steps of:

rotationally connecting a power take off shaft to the engine;

rotationally connecting an electrical generator directly to said power take off shaft, wherein directly rotationally connecting excludes rotationally connecting through the AMAD;

rotationally connecting said power take off shaft to the AMAD; and using said power take off shaft to drive said electrical generator, providing electrical power.

31. The method of claim 30, wherein said step of rotationally connecting said power take off shaft to the engine includes connecting said power take off shaft to a pre-existing spline interface with the engine.

32. The method of claim 30, wherein said step of rotationally connecting said power take off shaft to the AMAD includes steps of:

rotationally connecting said power take off shaft to an output shaft; and connecting said output shaft to a pre-existing spline interface with the AMAD.

33. The method of claim 30, wherein said step of rotationally connecting an electrical generator to said power take off shaft includes steps of:

mechanically connecting an internal shaft of said electrical generator to said power take off shaft; and mechanically connecting an output shaft to said internal shaft and in series between said internal shaft and the AMAD.

34. The method of claim 30, wherein said step of rotationally connecting an electrical generator to said power take off shaft includes steps of:

rotationally connecting an internal shaft of said electrical generator to said power take off shaft via a gearbox; and mechanically connecting an output shaft to said power take off shaft and in series between said power take off shaft and the AMAD.

* * * * *